(12) United States Patent
Yang et al.

(10) Patent No.: US 11,072,394 B2
(45) Date of Patent: Jul. 27, 2021

(54) ROTATION CALCULATING SYSTEM AND ROTATION CALCULATING METHOD

(71) Applicant: PixArt Imaging Inc., Hsin-Chu (TW)

(72) Inventors: Chung-Ting Yang, Hsin-Chu (TW); Yen-Min Chang, Hsin-Chu (TW); Ching-Lin Chung, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 16/705,246

(22) Filed: Dec. 6, 2019

(65) Prior Publication Data

US 2020/0108891 A1    Apr. 9, 2020

Related U.S. Application Data

(63) Continuation of application No. 15/647,249, filed on Jul. 11, 2017, now Pat. No. 10,538,288.

(51) Int. Cl.
| | |
|---|---|
| *B62M 25/08* | (2006.01) |
| *G01L 5/106* | (2020.01) |
| *G01P 3/486* | (2006.01) |
| *G01P 3/487* | (2006.01) |
| *B62M 3/08* | (2006.01) |
| *B62K 25/02* | (2006.01) |
| *B62J 45/20* | (2020.01) |
| *B62J 45/40* | (2020.01) |

(52) U.S. Cl.
CPC ............. *B62M 25/08* (2013.01); *G01L 5/106* (2013.01); *G01P 3/486* (2013.01); *B62J 45/20* (2020.02); *B62J 45/40* (2020.02); *B62K 2025/025* (2013.01); *B62K 2206/00* (2013.01); *B62M 3/08* (2013.01); *G01P 3/487* (2013.01)

(58) Field of Classification Search
CPC . B62M 25/08; B62M 3/08; B62J 45/40; B62J 45/20; B62K 2025/025; B62K 2206/00; G01P 3/486; G01P 3/487
See application file for complete search history.

(56) References Cited

U.S. PATENT DOCUMENTS

| | | | | |
|---|---|---|---|---|
| 6,804,897 | B1 * | 10/2004 | Horn ...................... | G01B 11/27 33/286 |
| 7,806,006 | B2 * | 10/2010 | Phillips ................. | G01L 3/1457 73/862.338 |
| 2011/0084822 | A1 * | 4/2011 | Li ............................ | B62J 99/00 340/432 |
| 2016/0136481 | A1 * | 5/2016 | Iverson ................... | B62K 3/00 73/379.07 |

(Continued)

FOREIGN PATENT DOCUMENTS

| | | |
|---|---|---|
| CN | 1888912 A | 1/2007 |
| CN | 101004341 A | 7/2007 |

(Continued)

*Primary Examiner* — Georgia Y Epps
*Assistant Examiner* — Don J Williams
(74) *Attorney, Agent, or Firm* — Winston Hsu

(57) ABSTRACT

A rotation calculating system, comprising: a first optical characteristic acquiring device, configured to acquire optical characteristics for at least one feature of a first target device; and a calculating unit, configured to calculate rotation for a first rotating device based on the optical characteristics of the feature of the first target device. The first rotating device is a wheel, and the first target device is the wheel.

3 Claims, 12 Drawing Sheets

(56) References Cited

U.S. PATENT DOCUMENTS

2017/0080970 A1\* 3/2017 Kezobo ................. B62D 5/046
2017/0320487 A1\* 11/2017 Greene ................. B60W 10/18

FOREIGN PATENT DOCUMENTS

| CN | 101054932 A | 10/2007 |
| CN | 201069443 Y | 6/2008 |
| CN | 103797357 A | 5/2014 |
| CN | 104670411 A | 6/2015 |
| CN | 105947096 A | 9/2016 |
| DE | 20 2011 004 068 U1 | 5/2011 |
| JP | 11-101812 A | 4/1999 |

\* cited by examiner

ROTATION CALCULATING SYSTEM AND ROTATION CALCULATING METHOD

CROSS REFERENCE TO RELATED APPLICATIONS

This application is a continuation of applicant's earlier application, Ser. No. 15/647,249, filed 2017 Jul. 11, and is included herein by reference.

BACKGROUND OF THE INVENTION

1. Field of the Invention

The present invention relates to a rotation calculating system and a rotation calculating method, and particularly relate to a rotation calculating system and a rotation calculating method which can calculate rotation based on an optical mechanism.

2. Description of the Prior Art

A conventional bicycle speed calculator applies a sensing magnet for calculating the rotation of the wheel, to accordingly calculate to speed of the bicycle. More specifically, a magnet sensor for the bicycle speed calculator is provided on the front fork of the bicycle, and the sensing magnet is provided on the spoke of the wheel. By this way, the magnet sensor can sense the movement of the sensing magnet, which corresponds to the rotation of the wheel. Thereby, the bicycle speed can be calculated based on the movement of the sensing magnet.

However, such bicycle speed calculator has some disadvantages. For example, if the sensing magnet has strong magnetic force, the magnet sensor can more easily sense the sensing magnet but the magnetic force may affect the wheel rotation since the bicycle rim, the forks and the spokes are all made of metals. On the opposite, if the sensing magnet has weak magnetic force, the magnet sensor hardly senses the sensing magnet. Additionally, most parts of the wheel does not comprise the sensing magnet thus cannot be sensed by the magnet sensor. Accordingly, calculation for the bicycle speed cannot be real-time and is not accurate.

SUMMARY OF THE INVENTION

One embodiment of the present invention is to provide a rotation calculating system which can be applied to measure a bicycle speed based on an optical mechanism.

Another embodiment of the present invention is to provide a rotation calculating method which can be applied to measure a bicycle speed based on an optical mechanism.

One embodiment of the present invention discloses a rotation calculating system, comprising: a first optical characteristic acquiring device, configured to acquire optical characteristics for at least one feature of a first target device; and a calculating unit, configured to calculate rotation for a first rotating device based on the optical characteristics of the feature of the first target device. The first rotating device is a wheel, and the first target device is the wheel.

Another embodiment of the present invention discloses a rotation calculating system, comprising: a first optical characteristic acquiring device, configured to acquire optical characteristics for at least one feature of a first target device; and a calculating unit, configured to calculate rotation for a first rotating device based on the optical characteristics of the feature of the first target device. The first rotating device is a pedal axis located in a pedal, and the first target device is the pedal.

Another embodiment of the present invention discloses a rotation calculating system, comprising: a first optical characteristic acquiring device, configured to acquire optical characteristics for at least one feature of a first target device; and a calculating unit, configured to calculate rotation for a first rotating device based on the optical characteristics of the feature of the first target device. The first rotating device is a pedal axis located in a pedal, and the first target device is the pedal axis.

Still another embodiment discloses a rotation calculating method, comprising: (a) detecting optical characteristics for at least one feature of a first target device; and (b) calculating rotation for a first rotating device based on the optical characteristics of the feature. The first rotating device is a wheel, and the first target device is the wheel.

In view of above-mentioned embodiments, speeds for a bicycle or a car can be calculated based on optical mechanisms, thus the in-accuracy issue for the conventional speed calculating method can be solved.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided for explaining the concept of the present invention in following descriptions.

Please note the component illustrated in following embodiments can be implemented by hardware (ex. circuit or mechanical structure) or hardware with software (ex. a processor with program code installed therein).

Figure 1:
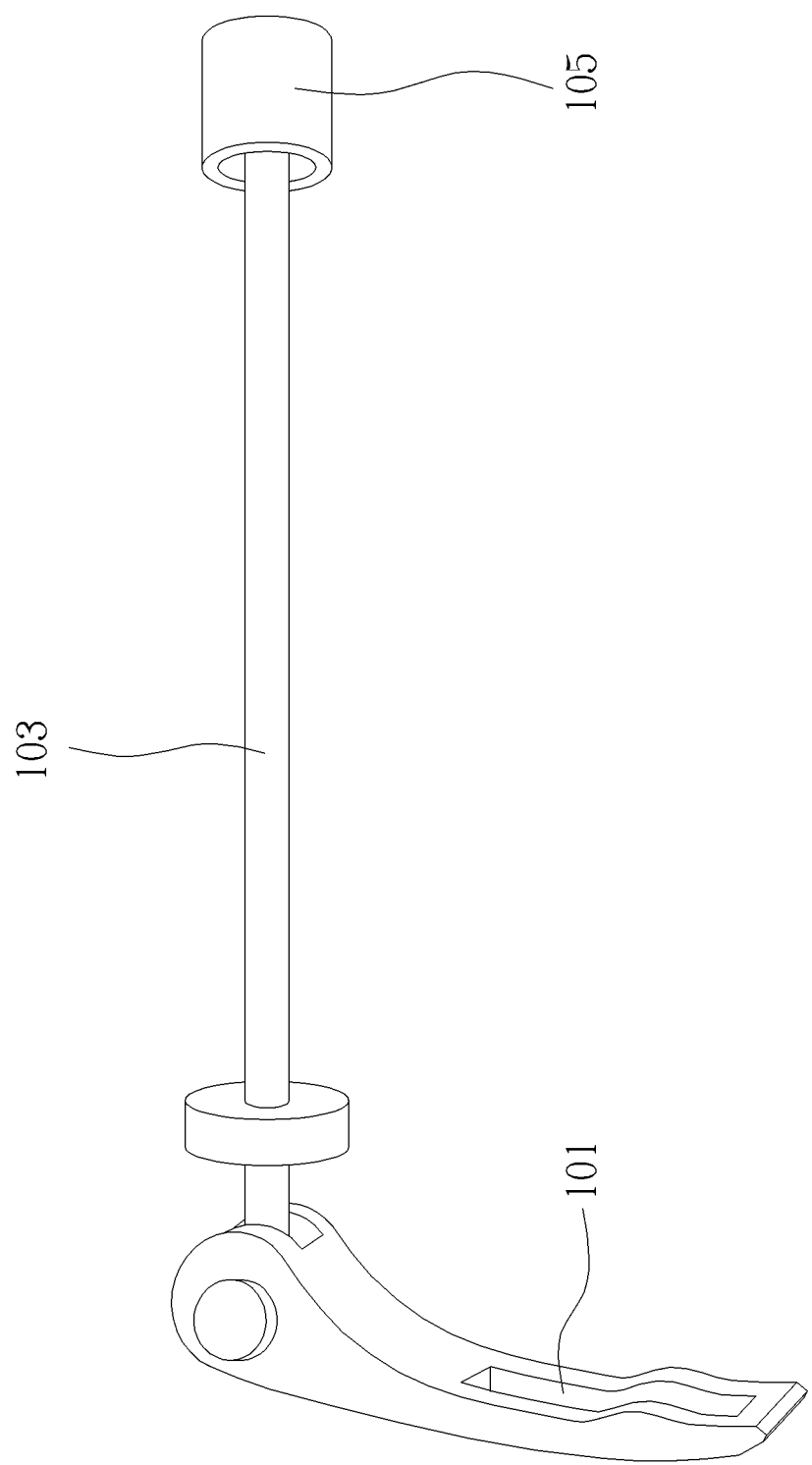
FIG. 1 is a schematic diagram illustrating a quick release according to one embodiment of the present invention.

FIG. 1 is a schematic diagram illustrating a quick release according to one embodiment of the present invention. As illustrated in FIG. 1, the quick release 100 comprises a holder 101, a quick release axle 103 and a fixer 105. The quick release 100 is connected to a wheel as a wheel axle via operating the holder 101 and the fixer 105, which will be described later.

Figure 2:
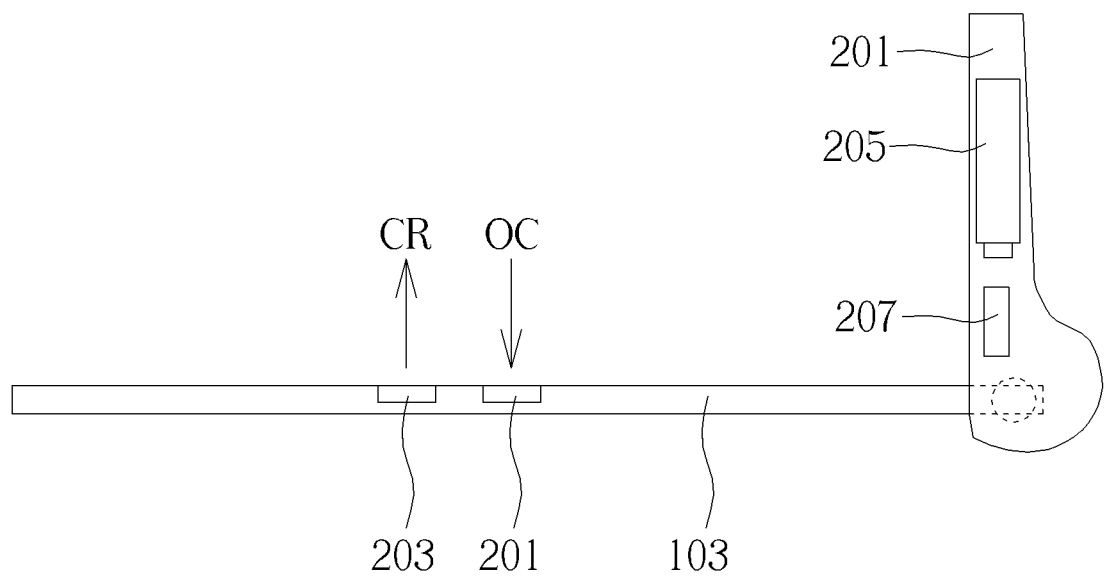
FIG. 2 and FIG. 3 are schematic diagrams illustrating details for the quick release according to one embodiment of the present invention.
Figure 3:
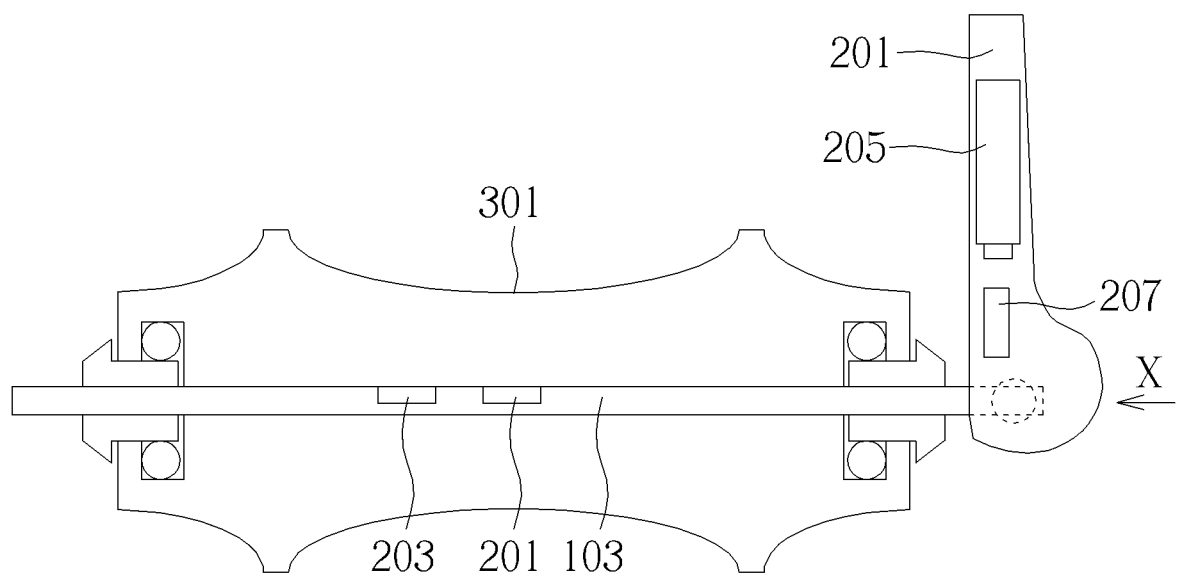

FIG. 2 and FIG. 3 are schematic diagrams illustrating details for the quick release according to one embodiment of the present invention. As illustrated in FIG. 2, the quick release axle 103 comprises a rotation calculating system comprising an optical characteristic acquiring device 201 and a calculating unit 203. The optical characteristic acquiring device 201 is configured to detect optical characteristics OC for at least one feature of a target device. The calculating unit 203 is configured to calculate rotation for a rotating device based on the optical characteristics OC, to generate a calculating result CR.

It will be appreciated that the target device and the rotating device can be the same device or different devices. Also, please note the calculating unit 203 is not limited to locate inside the quick release axle 103. If the calculating unit 203 is located inside the quick release axle 103, the calculating unit 203 outputs the calculating result CR to another device (ex. to a mobile phone located on a handlebar of the bicycle, such as 1107 in FIG. 11). Alternatively, if the calculating unit 203 is located outside the quick release axle 103 (ex. in a mobile phone located on a handlebar of the bicycle, such as 1107 in FIG. 11), the optical characteristic acquiring device 201 outputs the optical characteristic OC to the calculating unit 203.

In one embodiment, the rotating device is a wheel, and the target device is a hub connected to the wheel. That is, the optical characteristic acquiring device 201 acquires the optical characteristics for a feature for a hub's inner surface, and then the calculating unit 203 calculates rotation of the wheel according to the optical characteristics for a feature of the hub.

As illustrated in FIG. 3, the quick release axle 103 of the quick release 100 is assembled to the hub 301, thus the optical characteristic acquiring device 201 is also inside the hub 301. By this way, the optical characteristic acquiring device 201 can acquire the optical characteristic OC for an inner surface of the hub 301. The feature means anything can be recognized, in or on inner surface of the hub 301. For example, a texture, a mark, a crack or specific material in or on the hub 301, and the above-mentioned optical characteristics can be the image or the spectrum of the feature. The embodiment illustrated in FIG. 3 has the advantage that the optical characteristic acquiring device 201 can avoid the damage caused by water or dust, since it is inside the hub 301.

In one embodiment, the optical characteristic acquiring device 201 is an image sensor for sensing a sensing image comprising the feature of the target device.

In one embodiment, the feature is a mark and the optical characteristic acquiring device 201 is an image sensor for sensing an image comprising the feature of the hub 301. The details are illustrated in FIG. 4-FIG. 7 of the present invention. Please note, FIG. 4 to FIG. 7 are diagrams illustrated in a view following the X direction in FIG. 3.

Figure 4:
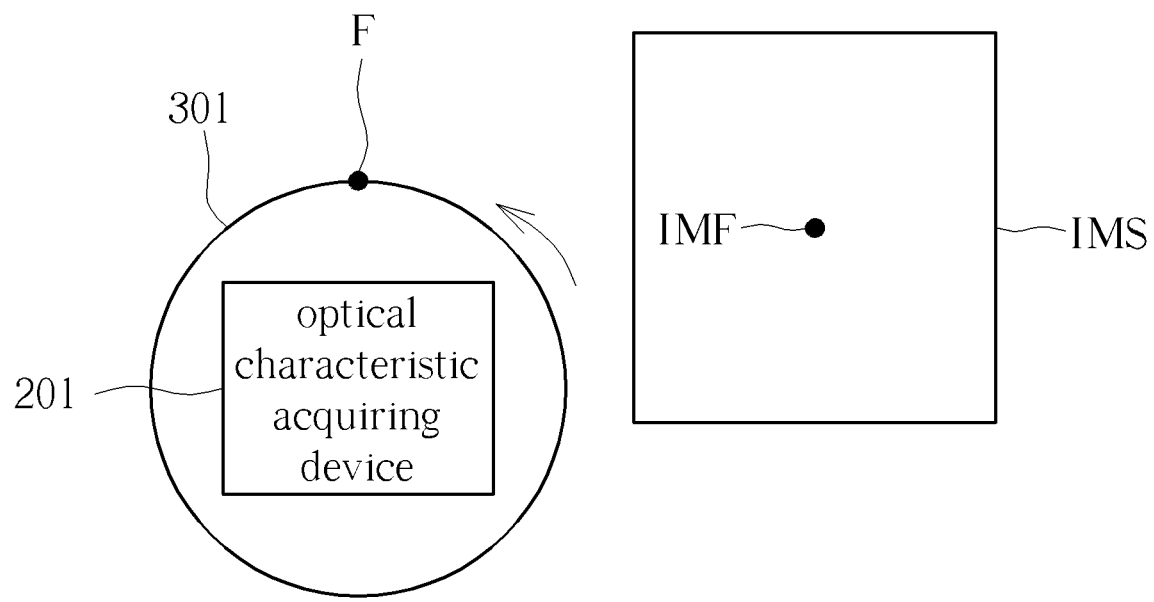
FIG. 4-FIG. 7 are schematic diagrams illustrating how to acquire optical characteristics according to one embodiment of the present invention.

As illustrated in FIG. 4, the optical characteristic acquiring device 201 captures a sensing image IMS comprising a feature image IMF. Please note the sensing image IM does not necessarily have a resolution as high as a resolution for an image captured by a powerful camera. The resolution or details of the sensing image IM can be set as low as possible, only if the feature F can be recognized. Please refer to FIG. 4, in the example of FIG. 4, the feature image IMF is at a center of the sensing image IM.

Figure 5:
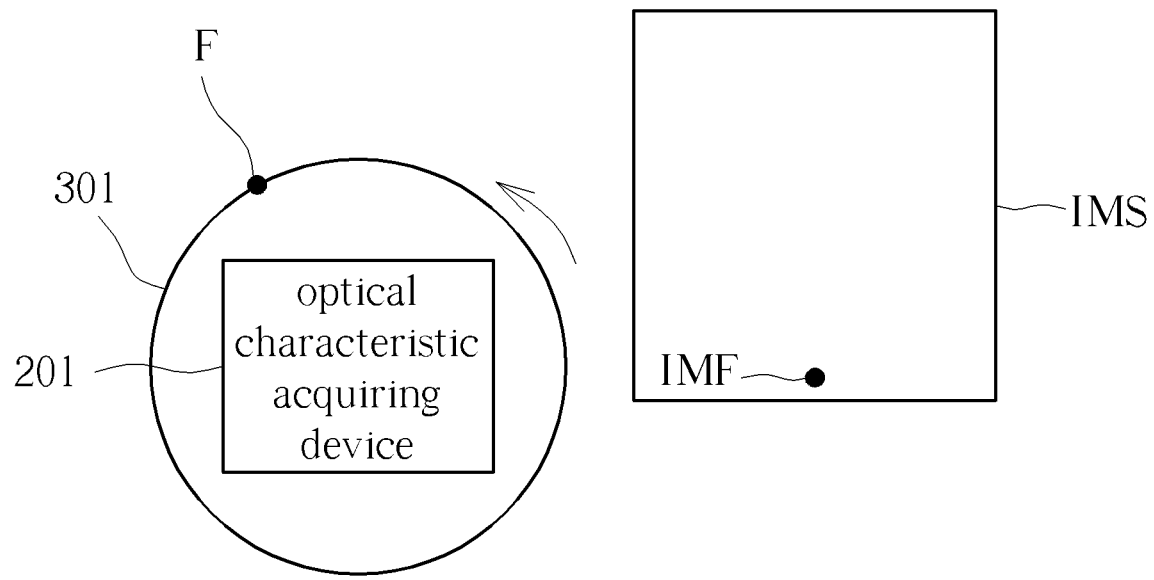
Figure 6:
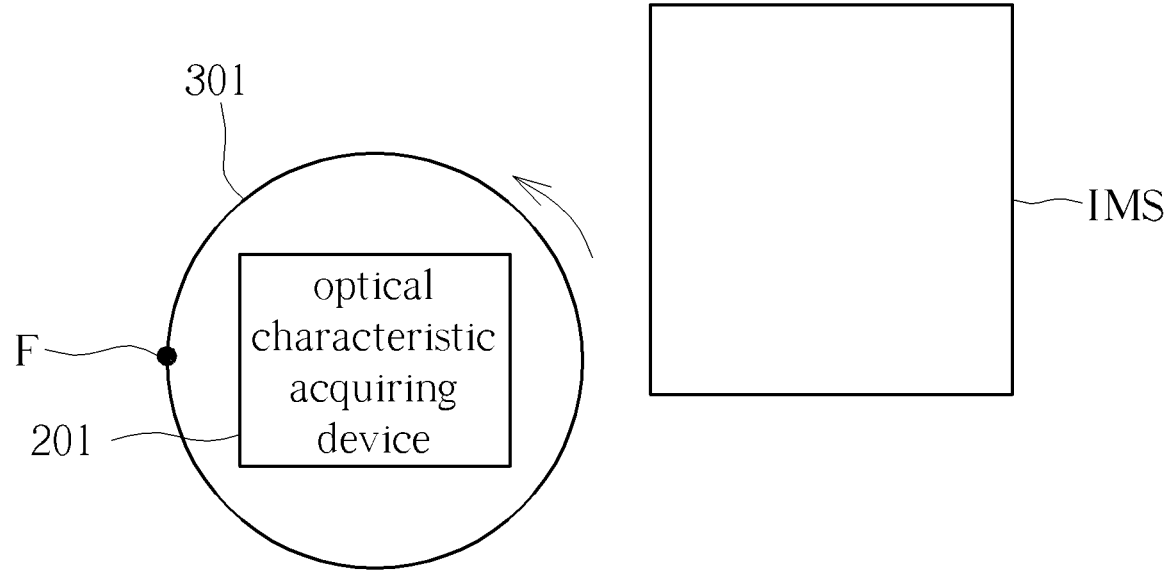
Figure 7:
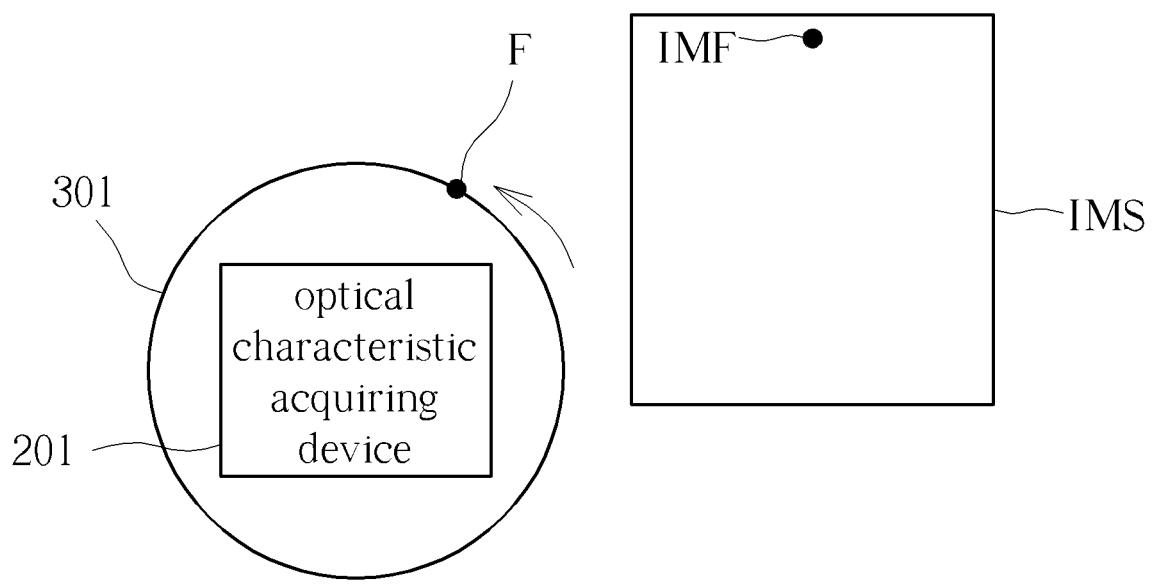

In FIG. 5, the hub 301 rotates counter clockwise, thus the location for the feature F in the sensing image IM moves. In FIG. 6, the hub 301 continuously rotates counter clockwise, and the feature F moves to the top of the rotating bar 103. Accordingly, in FIG. 6 the feature image IMF does not appear in the sensing image IMS. In FIG. 7, the hub 301 continuously rotates counter clockwise, and the feature F keeps moving, thus the feature image IMF correspondingly moves and appears again. Following FIG. 7, the feature F goes back to the location illustrated in FIG. 4, thus the feature image IMF moves the center of the sensing image IMS again, which means the hub 301 has a full rotation. Accordingly, the calculating unit 203 can calculate a number of full rotations of the hub 301 based on the feature M of the hub 301. Please note, the calculating unit 203 is not limited to calculate a number of full rotations of the hub 301. The calculating unit 203 can calculate the rotation angle (ex. 90 degree) of the hub 301 based on the optical characteristics. For example, if more than one feature is provide for the hub, the calculating unit 203 can calculate the rotation angle based on the optical characteristics for different features, rather than calculate the number of full rotations.

In another embodiment, the feature F has predetermined material, and the optical characteristic acquiring device 201 comprises a laser device. The optical characteristic acquiring device 201 emits laser to the hub 301 and can acquire a predetermined spectrum if the feature F is in the emitting range of the optical characteristic acquiring device 201. That is, the hub 301 can be determined to rotate for a full rotation if the predetermined spectrum occurs two times.

Figure 8:
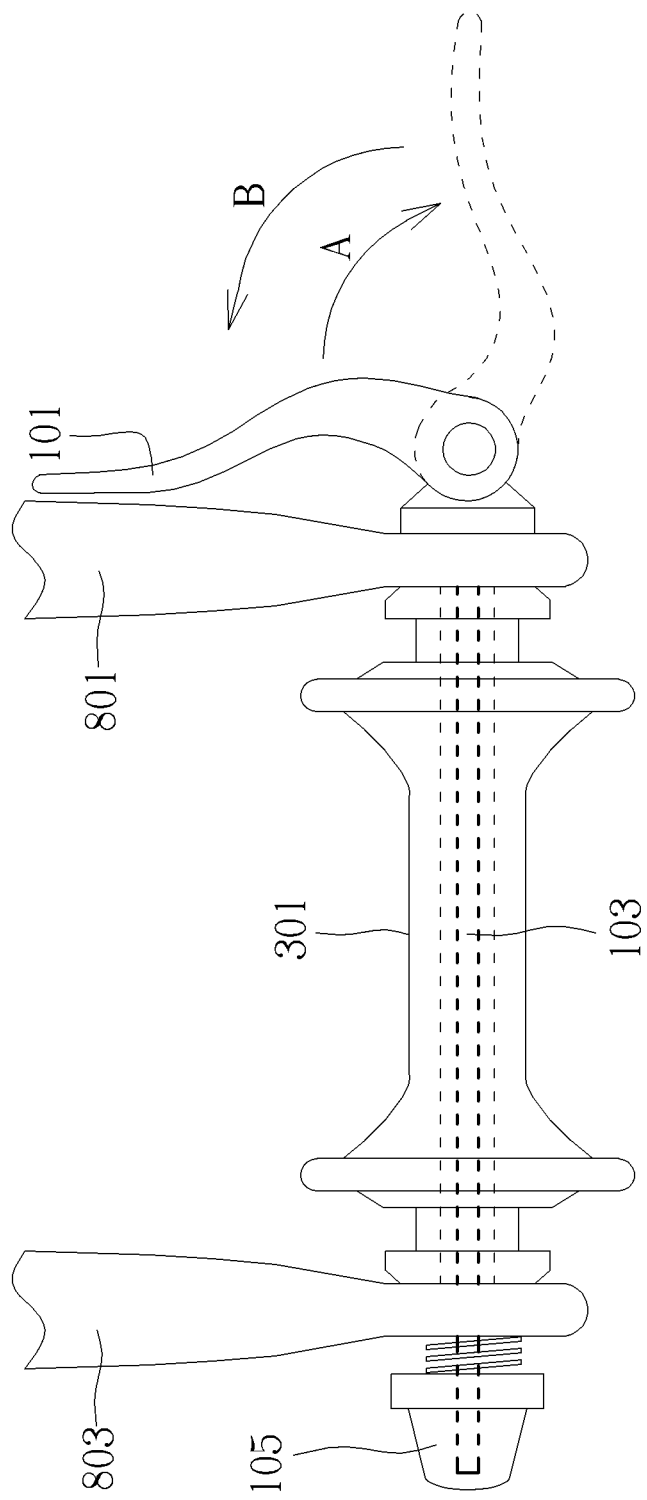
FIG. 8 and FIG. 9 are schematic diagram illustrating that the quick release illustrated in FIG. 2 and FIG. 3 are assembled to a wheel.
Figure 9:
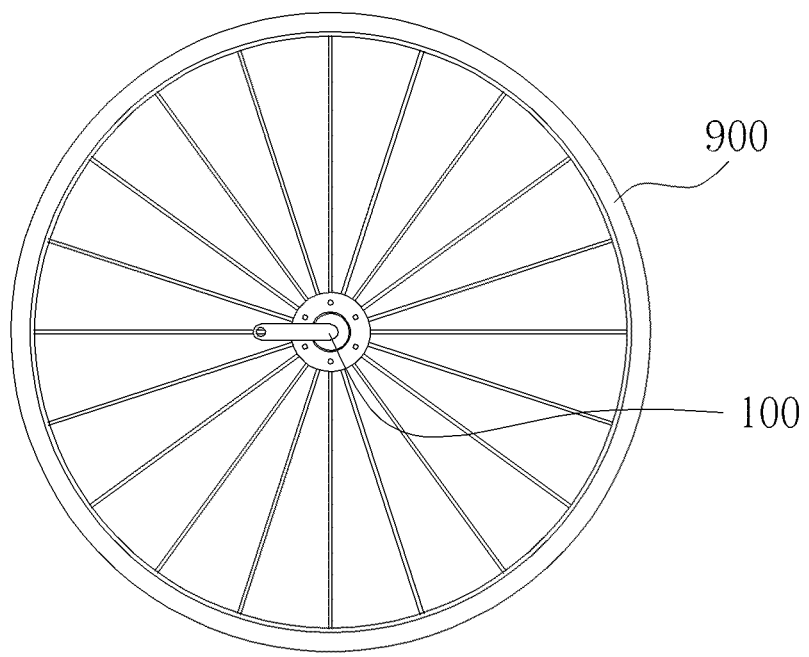

FIG. 8 and FIG. 9 are schematic diagram illustrating that the quick release illustrated in FIG. 2 and FIG. 3 are assembled to a wheel. As illustrated in FIG. 8, the hub 301 is connected to front forks 801, 803 of a bicycle, and the quick release axle 103 is assembled to the hub 301. In such case, the quick release 100 is served as a wheel axle. The holder 101 is applied to fix one terminal of the quick release axle 103 to the front fork 801. For more detail, if the holder 101 is in the position B, the quick release axle 103 is fixed to the front fork 801. On the opposite, if the holder 101 is in the position A, the quick release axle 103 is released from the front fork 801. The fixer 105 is applied to fix another terminal of the quick release axle 103 to the front fork 803. The fixer 105 can have any mechanical structure that can be applied to fix the quick release axle 103 to the front fork 803, for example, a plug or a bolt. Via operating the holder 101 and the fixer 105, the quick release 100 can be connected to a wheel or be released from the wheel. FIG. 9 is another schematic diagram illustrating the quick release 100 is assembled to a wheel 900, which is illustrated in a view following the Y direction in FIG. 8. Based on FIG. 9, it can be clearly understood that the quick release 100 is served as a wheel axle of the wheel 900.

Figure 10:
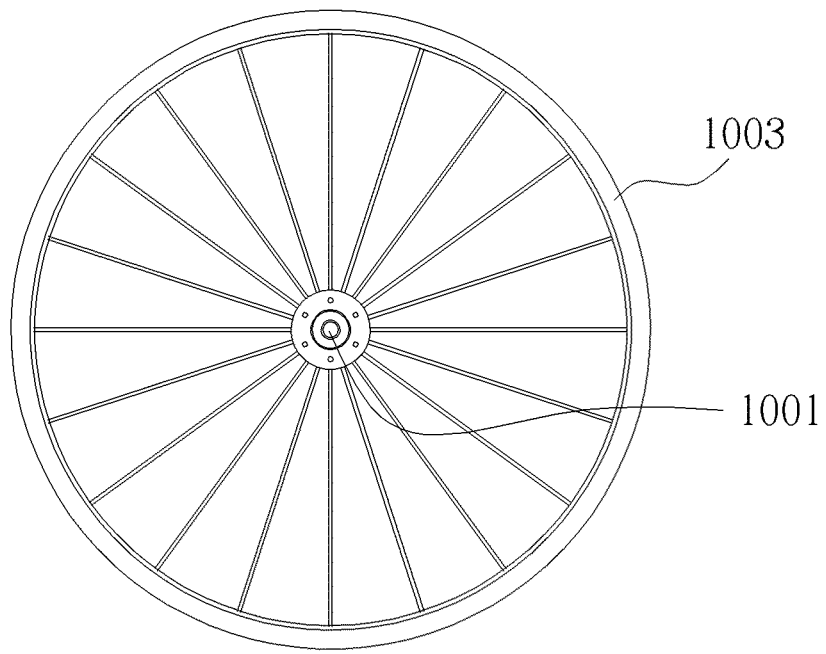
FIG. 10 is a schematic diagram illustrating the quick release is replace by another kind of wheel axle.

Please note, the above-mentioned quick release 100 can be replaced by another kind of wheel axle. As illustrated in FIG. 10, the wheel axle 1001 is connected to the wheel 1003 via other kinds of fixing components rather than the above-mentioned holder and fixer. In such case, the above-mentioned wireless communication device and the battery are provided in the quick release axle, which is inside the hub. Such variation should also fall in the scope of the present invention.

Figure 11:
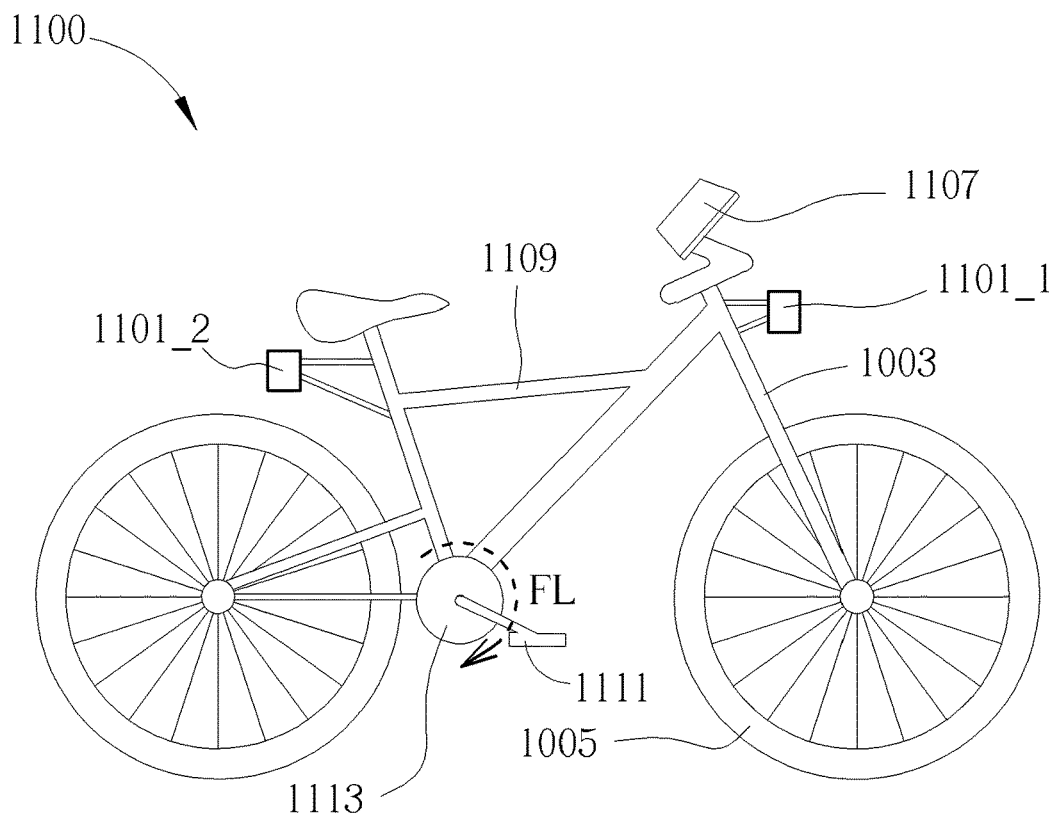
FIG. 11 is a schematic diagram illustrating another aspect for the rotation calculating system according to another embodiment of the present invention.

In above-mentioned embodiments, the optical characteristic acquiring device is provided inside the hub. However, the optical characteristic acquiring device can be provided to other locations of the bicycle. FIG. 11 is a schematic diagram illustrating another aspect for the rotation calculating system according to another embodiment of the present invention.

As illustrated in FIG. 11, the optical characteristic acquiring device 1101_1 is fixed to the front fork 1103, such that the optical characteristic acquiring device 1101_1 acquires optical characteristics for a feature of an outer surface of the wheel 1105, and the calculating unit inside the mobile phone 1107 calculates rotation for the wheel 1105 based on the optical characteristics of the feature for an outer surface of the wheel 1105. By this way, the bicycle speed can be calculated. Please note, the location of the optical characteristic acquiring device is not limited to the location of the optical characteristic acquiring device 1101_1. For example, the optical characteristic acquiring device 1101_2 is fixed to the frame 1109. The embodiment illustrated in FIG. 11 is only for example, the optical characteristic acquiring device and the calculating device can be provided to any location of the bicycle.

Figure 12:
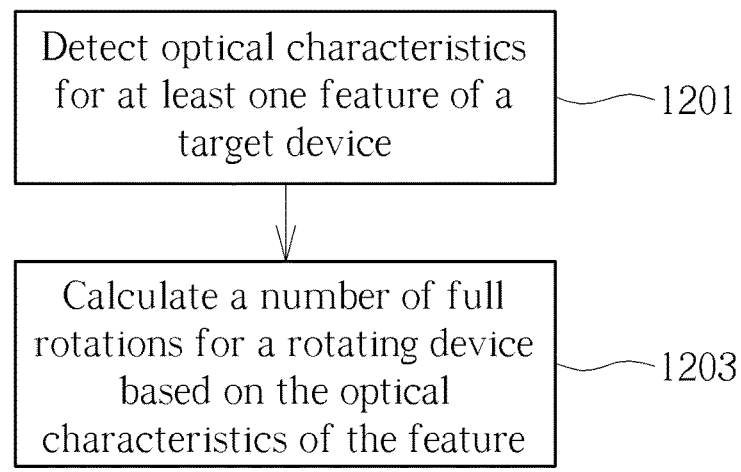
FIG. 12 is a flow chart illustrating a rotation calculating method according to one embodiment of the present invention.

In view of above-mentioned embodiments, a rotation calculating method illustrated in FIG. 12 can be acquired, which comprise following steps:

Step 1201

Detect optical characteristics for at least one feature of a target device.

Step 1203

Calculate rotation (ex. a number for full rotations or rotation degree) for a rotating device based on the optical characteristics of the feature.

As stated in above-mentioned embodiments, the target device and the rotating device can be the same device or different devices. Also, if the rotation calculating method illustrated in FIG. 12 is applied to calculate a bicycle speed, a step of "calculating the bicycle speed according to the rotation for the rotating device" can be acquired. Other details for the rotation calculating method are illustrated in above-mentioned embodiments, thus are omitted for brevity here.

In some of the above embodiments, the optical characteristic acquiring device or the calculating unit is provided in the wheel axle. Therefore, the optical characteristic acquiring device or the calculating unit maybe polluted by dust or water while the bicycle is moving, since the wheel axle is near the ground. Therefore, in one embodiment, a waterproofing mechanism or a dustproofing mechanism is provided to the wheel axle.

Figure 13:
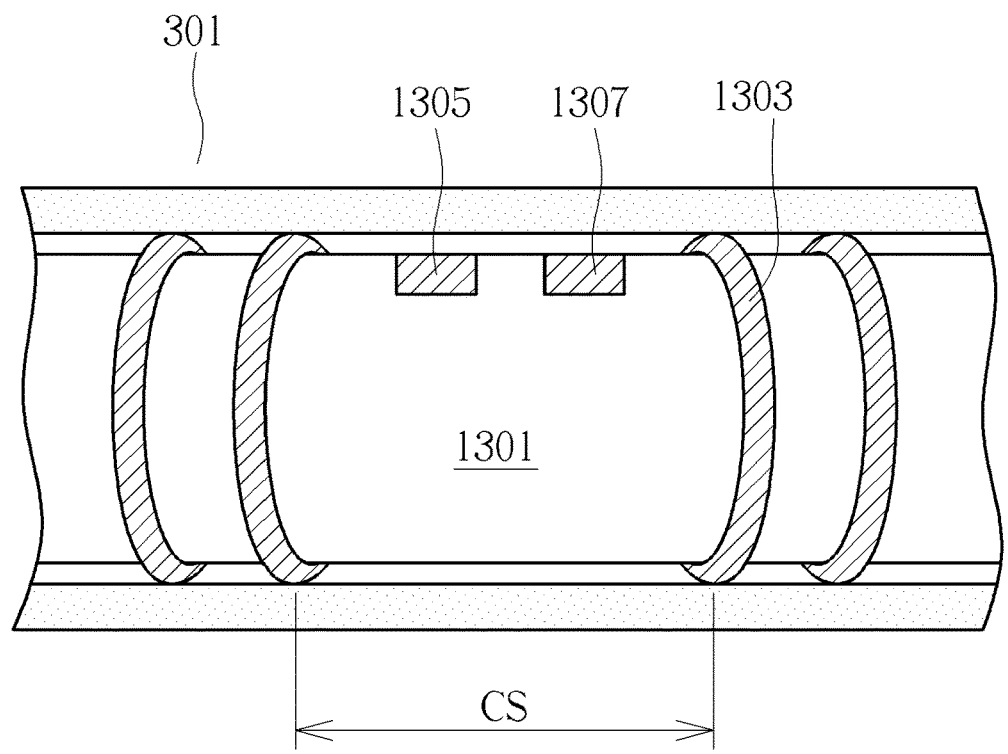
FIG. 13 is schematic diagram illustrating a structure that can provide waterproofing or dustproofing according to one embodiment of the present invention.

FIG. 13 is schematic diagram illustrating a structure that can provide waterproofing or dustproofing according to one embodiment of the present invention. As illustrated in FIG. 13, the wheel axle 1301 (ex. the quick release 103 in FIG. 3) further comprises seal material 1303 provided on the wheel axle 1301. The seal material 1303 is provided between the wheel axle 1301 and the hub 301 and provides a confined space CS for a part of the wheel axle 1301 while the wheel axle 1301 is inside the hub 301. The optical characteristic acquiring device 1305 or the calculating unit 1307 is in the confined space CS, which means a place that the water or dust cannot enter, thus the optical characteristic acquiring device 1305 or the calculating unit 1307 can be protected from dust and water. Accordingly, the seal material 1303 can be any material that can fulfill the gap between the hub 301 and the wheel axle 1301 to provide the confined space CS, for example, silicon films.

Additionally, one embodiment of the present invention provides a mistake-proofing component configured to indicate a direction for assembling the wheel axle to the hub. By this way, the user can feel more convenient while assembling the wheel axle to the hub, and the optical characteristic acquiring device or the calculating unit can locate at proper locations.

Figure 14A:
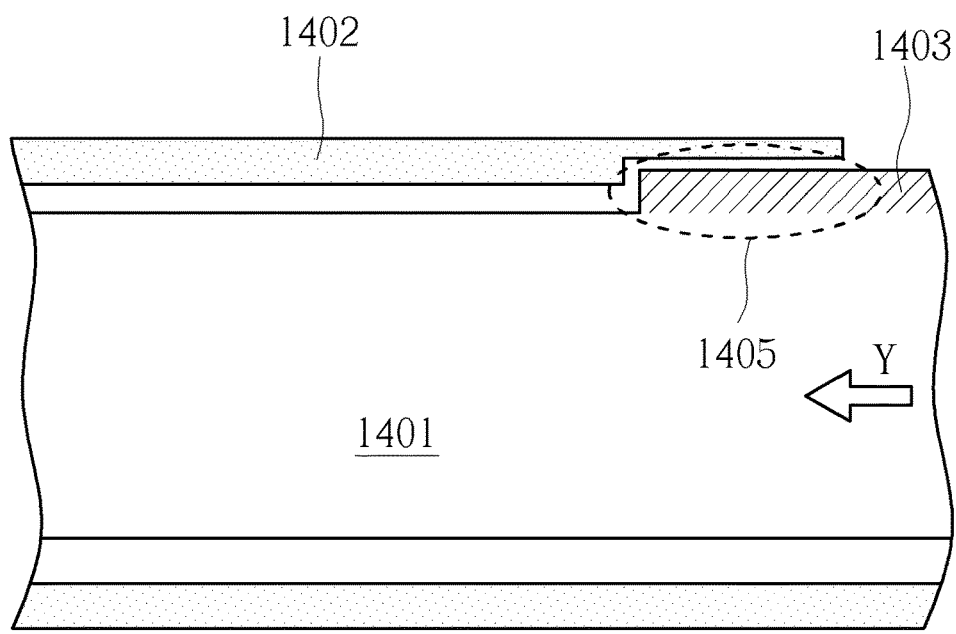
FIG. 14A and FIG. 14B are schematic diagrams illustrating a mistake-proofing component for a wheel axle according to one embodiment of the present invention.
Figure 14B:
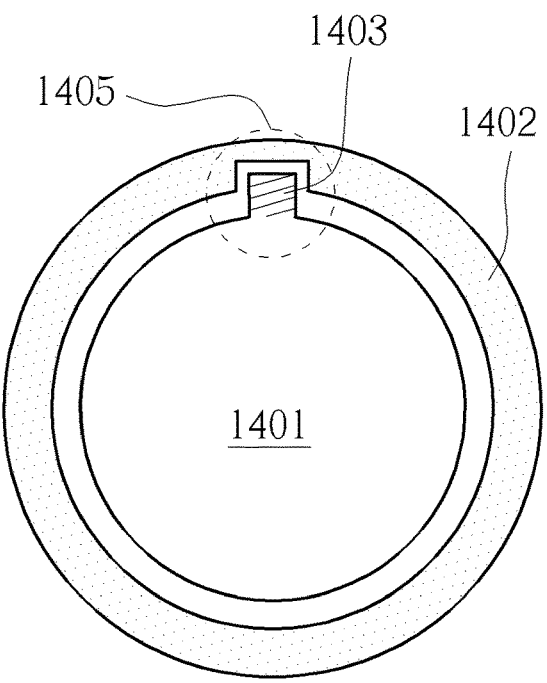

FIG. 14A and FIG. 14B are schematic diagrams illustrating a mistake-proofing component for a wheel axle according to one embodiment of the present invention. As illustrated in FIG. 14A, the mistake proofing component is a protruding part 1403 of the wheel axle 1401, and the hub 1402 further comprises a trench 1405 corresponding to the protruding part 1403. The user can aim the protruding part 1403 to the trench 1405 while assembling the wheel axle 1401 to the hub 1402, such that the wheel axle 1401 can be correctly inserted and engaged to the hub 1402.

Therefore, the protruding part 1403 can indicate a direction for assembling the wheel axle to the hub. FIG. 14B illustrates a schematic diagram illustrated in a view following the Y direction in FIG. 14A. Based on FIG. 14A and FIG. 14B, the relations between the components illustrated in FIG. 14A can be more clearly understood. It will be appreciated the mistake-proofing component is not limited to the embodiments illustrated in FIG. 14A and FIG. 14B. Any mistake-proofing component that can indicate a direction for assembling the wheel axle to the hub should fall in the scope of the present invention.

Figure 15:
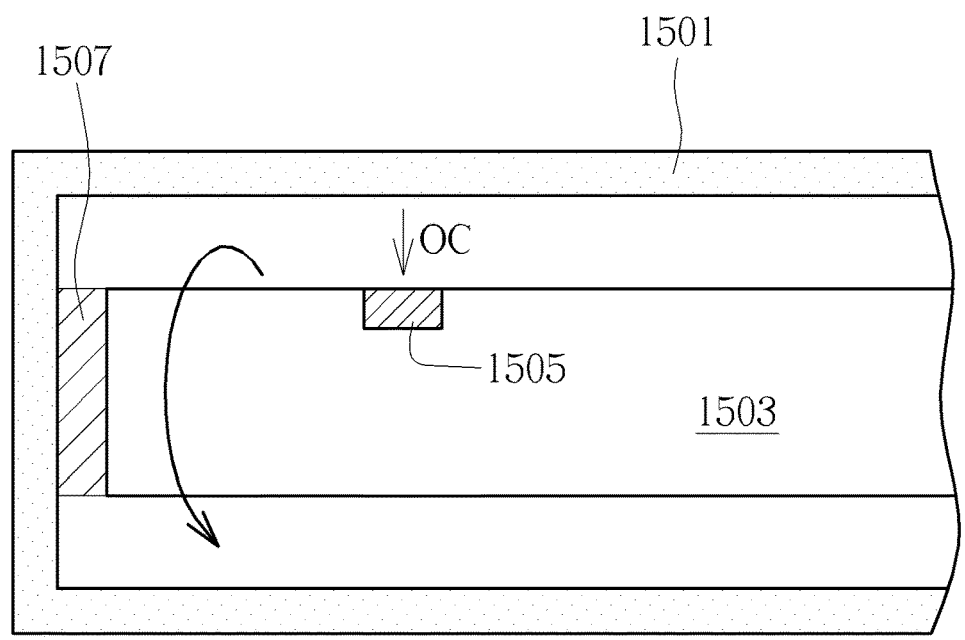
FIG. 15, FIG. 16 are schematic diagrams illustrating that the rotation calculating method is applied to a pedal, according to embodiments of the present invention.
Figure 16:
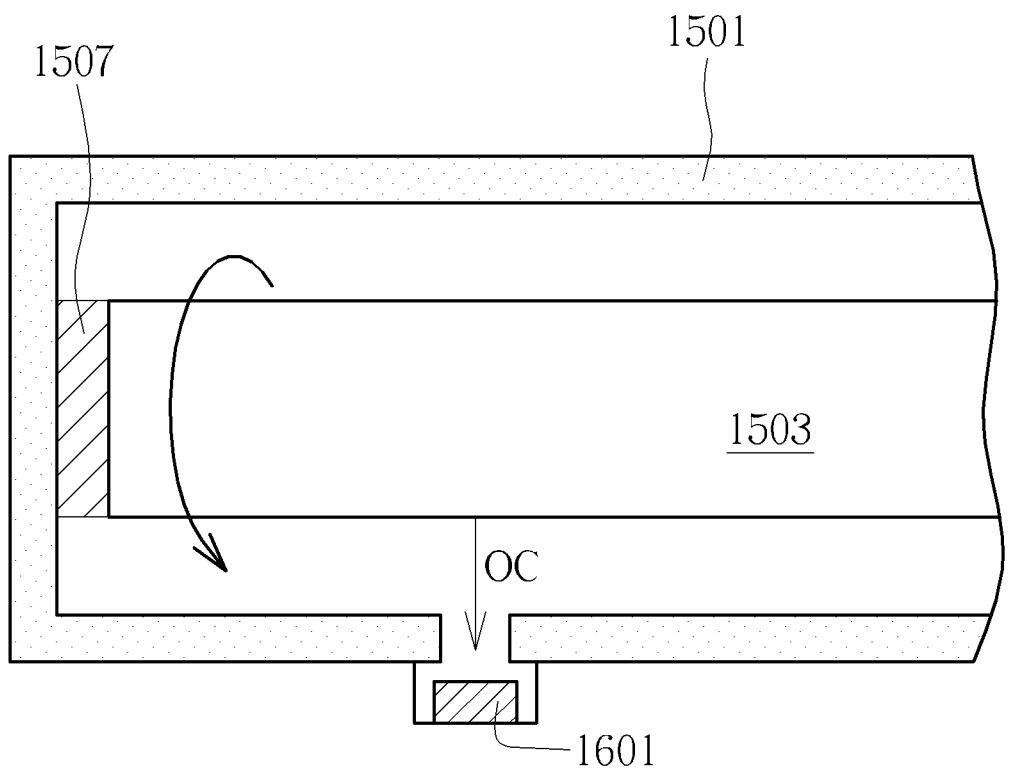

Besides the above wheel axle, the rotation calculating method or rotation calculating system provided by the present invention can be applied to other apparatuses. FIG. 15, FIG. 16 are schematic diagrams illustrating the rotation calculating method is applied to a pedal of a bicycle, according to embodiments of the present invention.

Please refer to FIG. 11, a user pushes the pedal 1111 forwards (i.e. rotates surrounding the chain wheel 1113) to rotate the chain wheel 1113 while riding the bicycle 1100, such that the wheel 1005 can correspondingly rotates. Therefore, if the pedal 1111 is pushed to have a full rotation FL surrounding the chain wheel 1113, the chain wheel 1113 also has corresponding rotation. By this way, the speed of the bicycle 1100 can be calculated since the rotation of the chain wheel 1113 corresponds to the rotation of the wheel 1005.

In FIG. 15, the optical characteristic acquiring device 1505 is provided in the pedal axle 1503. The pedal axle 1503 has relative rotation with the pedal 1501 while the pedal 1501 rotates as illustrated in FIG. 11. For more detail, a bearing 1507 is provided in the pedal 1501 and connected to the pedal 1501. Via the bearing 1507, relative rotation exists between the pedal 1501 while the pedal 1501 rotates as illustrated in FIG. 11. Please note, FIG. 15 is only for example, any structure that can provide relative rotation between the pedal and the pedal axle should also fall in the scope of the present invention.

Therefore, the optical characteristic acquiring device 1505 acquires optical characteristics OC for at least one feature of the pedal 1501. Also, the calculating unit, which can be provided inside or outside the pedal axle 1503 but not illustrated here, can calculate rotation for the pedal axle 1503 based on the optical characteristics OC acquired by the optical characteristic acquiring device 1505.

It should be noted that the location of the optical characteristic acquiring device is not limited to the embodiment illustrated in FIG. 15. For example, in the embodiment of FIG. 16, the optical characteristic acquiring device 1601 is provided outside the pedal 1501 (but can be in the pedal as well). In such embodiment, the optical characteristic acquiring device 1601 acquires optical characteristics OC for at least one feature of the pedal axis 1503. Also, the calculating unit, which can be provided inside or outside the pedal 1501 but not illustrated here, can calculate rotation for the pedal axle 1503 based on the optical characteristics OC acquired by the optical characteristic acquiring device 1601.

In view of the embodiments of FIG. 15 and FIG. 16, the speed of the bicycle can be calculated, thus the force for the right leg and the left leg can be respectively tested and calculated based on the speed of the bicycle. If the right leg force and the left leg force are different, the balance of the user riding the bicycle may be affected. Therefore, the rotation calculating system and the rotation calculating method provided by the present invention can be applied to adjust the right leg force and the left leg force to make the user balance better while riding the bicycle. Other user information or bicycle information besides the right leg force and the left leg force can be acquired based on the bicycle speed as well, which will be described in a following embodiment.

Based on above-mentioned methods, various user information or bicycle information can be acquired. For example, a maximum speed, a total riding distance, calories burned, an average cadence, or a highest cadence can be acquired based on the bicycle speed acquired via above-mentioned methods. Additionally, the power rate that the user provide can be measured if the speed, the cadence, and the settings for the bicycle (ex. transmission range) are known.

Further, the settings of the bicycle can be set to a training mode, to train the user to have ideal performance, such as an ideal endurance, an ideal average speed, an ideal highest speed, or an ideal posture, based on a training model. In one embodiment, the training model can be established via recording another user's action. Besides, the bicycle can be controlled via various user interfaces, for example, a user interface located on the bicycle, or a smart electrical device connected to the bicycle via wireless communication (ex. a smart watch), or a speech control device.

Additionally, a pedaling force (i.e. the above-mentioned right leg force and the right leg force) can be acquired if the bicycle speed is acquired. Also, an angle between the pedal and the pedaling force direction can be calculated, and the stability for providing the pedal force can be measured. By this way, it can be determined whether the user has a correct posture or not, or whether each part of the bicycle works normally or not. Besides, based on above-mentioned user information or bicycle information, it can be determined if any part of the bicycle such as the seat height or the handle height should be adjusted or not.

Figure 17:
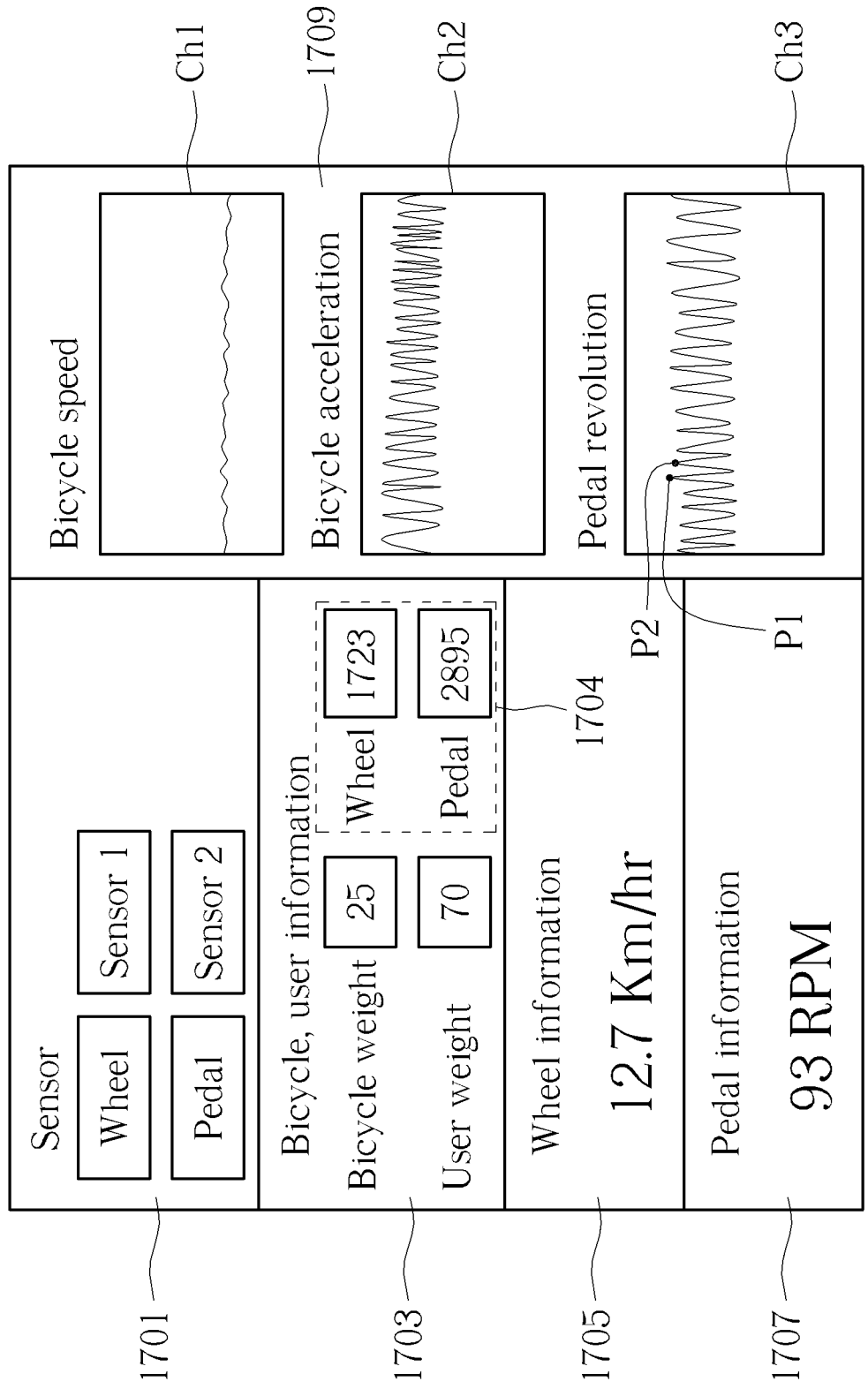
FIG. 17 is a schematic diagram illustrating a user interface applying a speed detecting method based on above-mentioned rotation calculating methods.

FIG. 17 is a schematic diagram illustrating a user interface 1700 applying a speed detecting method based on above-mentioned rotation calculating methods. As illustrated in FIG. 17, the user interface 1700 comprises a sensor setting region 1701, an information setting region 1703, a wheel information region 1705, a pedal information region 1707 and a chart region 1709.

As above-mentioned, the optical characteristic acquiring device can be provided to various locations of the bicycle. Accordingly, more than one optical characteristic acquiring device may be provided on or in the bicycle and the user can select which one of the optical characteristic acquiring devices will be used. Of course, the user can select more than one optical characteristic acquiring device to acquire more accurate speed calculating.

Also, the user can manually set bicycle information or user information via the information setting region 1703, for example, the user can set bicycle weight or user weight. In one embodiment, the information setting region 1703 further comprises a compensation setting region 1704, via which the user can set compensation values for different parts of the bicycle.

The wheel information region 1705 can show wheel-related information, for example, a bicycle speed which is calculated based on the rotation of the wheel. In another embodiment, the wheel information region 1705 further show other wheel-related information besides the bicycle speed, for example, a total riding distance, or calories burned. The pedal information region 1707 shows pedal-related information, such as RPM (revolutions per minute) or the highest cadence.

The chart region 1709 illustrates charts for the user information. For example, the chart Ch1 illustrates the bicycle speed, the chart Ch2 illustrates the bicycle acceleration calculated based on the bicycle speed, and the chart Ch3 illustrates the pedal revolution (i.e. the pedal has a full rotation for the chain wheel). In the chart Ch3, the curve means the pedaling force, and the peak means the user provides maximum pedaling power, which always occurs while the pedal moves to the chain wheel. Accordingly, two peaks (one for the left pedal and one for the right pedal) always mean a pedal revolution.

Please note, the above-mentioned user information, bicycle information and the regions for the user interface are only for example and do not mean to limit the scope of the present invention.

Figure 18:
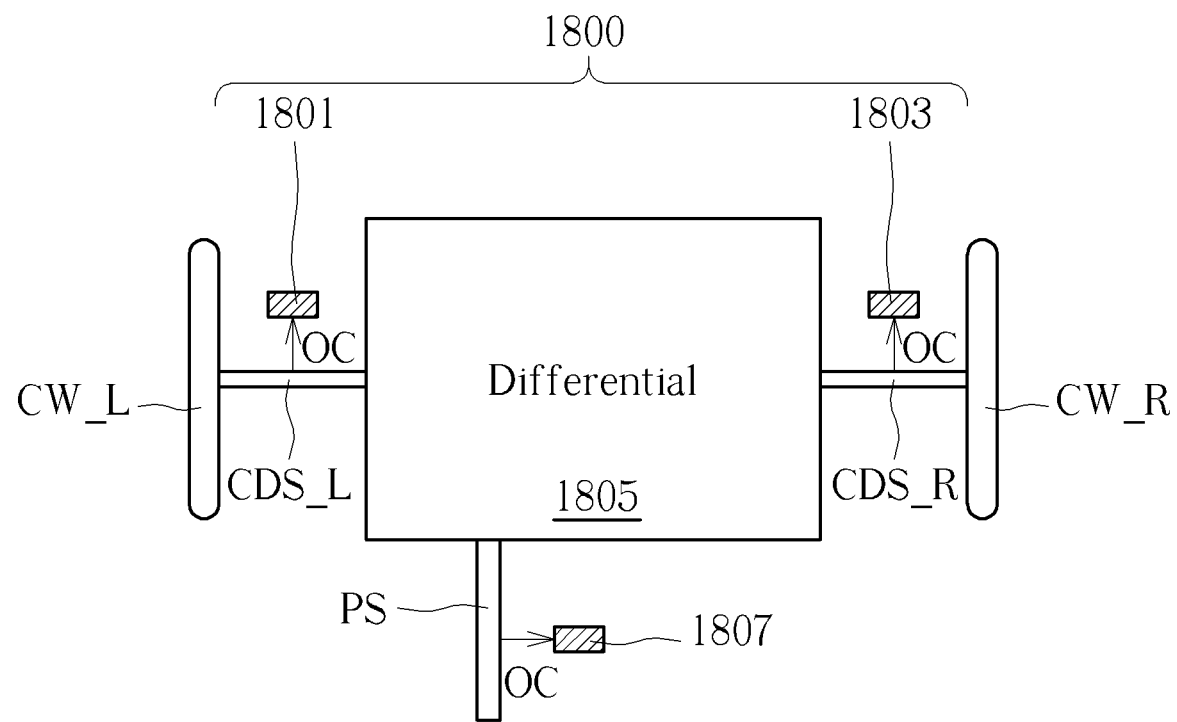
FIG. 18 is a schematic diagram illustrating that the rotation calculating method is applied to a car, according to one embodiment of the present invention.

FIG. 18 is a schematic diagram illustrating the rotation calculating method is applied to a car, according to one embodiment of the present invention. As illustrated in FIG. 18, the rotation calculating system 1800 comprises an optical characteristic acquiring device 1801 and an optical characteristic acquiring device 1803. The optical characteristic acquiring device 1801 acquires optical characteristics OC for at least one feature of the left car drive shaft CDS_L, and the characteristic acquiring device 1803 acquires optical characteristics OC for at least one feature of the right car drive shaft CDS_R. After that, a calculating unit, which can be provided in any place of the car, respectively calculates rotation for the left car wheel CW_L and the right car wheel CW_R according to the optical characteristics OC. By this way, the speed for the left car wheel CW_L and the speed for right car wheel CW_R can be respectively calculated.

A car always comprises a differential 1805, thereby a car can smoothly turn. For more detail, car wheels spin at different speeds while turning. In other words, each wheel travels a different distance through the turn, and that the inside wheels travel a shorter distance than the outside wheels. Since speed is equal to the distance traveled divided by the time, the wheels that travel a shorter distance travel at a lower speed. The differential 1805 is connect to the left car drive shaft CDS_L and the right car drive shaft CDS_R, and comprises a plurality of gears to allow the left car wheel CW_L and the right car wheel CW_R to have different speeds.

The differential 1805 is an apparatus known by persons skilled in the art, for example, US patents with patent number U.S. Pat. Nos. 4,693,134 and 4,874,059 mention about the differential. Thus, no further explaining is provided here.

In one embodiment, the rotation calculating system 1800 comprises an optical characteristic acquiring device 1807, which is applied to acquire optical characteristics OC for at least one feature of a pinion shaft PS, which is applied to provide car power to the differential 1805. After that, the calculating unit can calculate the n rotation for the pinion shaft PS according to the acquire optical characteristics OC acquired by the optical characteristic acquiring device 1807. The rotation for the pinion shaft PS corresponds to the car speed, since the car power is provided by a car engine. Therefore, the car speed can be acquired via calculating rotation for the pinion shaft PS.

In one embodiment, the differential 1805 has a case which contains a plurality of gears, and the optical characteristic acquiring device 1801, 1803 or 1807 can locate in this case, by this way, the optical characteristic acquiring device can be protected from pollution.

In view of above-mentioned embodiments, speeds for a bicycle or a car can be calculated based on optical mechanisms, thus the in-accuracy issue for the conventional speed calculating method can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A rotation calculating system, comprising:
a first optical characteristic acquiring device, configured to acquire optical characteristics for at least one feature of a first target device; and
a calculating unit, configured to calculate rotation for a first rotating device based on the optical characteristics of the feature of the first target device;
wherein the first optical characteristic acquiring device and the calculating unit are provided inside a quick release axle of a quick release of a bicycle.

2. A rotation calculating system, comprising:
a first optical characteristic acquiring device, configured to acquire optical characteristics for at least one feature of a first target device; and
a calculating unit, configured to calculate rotation for a first rotating device based on the optical characteristics of the feature of the first target device;
wherein the first optical characteristic acquiring device and the calculating unit are provided inside a quick release axle of a quick release of a bicycle;
wherein the first rotating device is a wheel of the bicycle.

3. A rotation calculating system, comprising:
a first optical characteristic acquiring device, configured to acquire optical characteristics for at least one feature of a first target device; and
a calculating unit, configured to calculate rotation for a first rotating device based on the optical characteristics of the feature of the first target device;
wherein the first optical characteristic acquiring device and the calculating unit are provided inside a quick release axle of a quick release of a bicycle;
wherein the first rotating device is a wheel of the bicycle, and the first target device is a hub connected to the wheel.

* * * * *